(12) United States Patent
Timner et al.

(10) Patent No.: US 9,172,508 B2
(45) Date of Patent: *Oct. 27, 2015

(54) METHOD AND A DEVICE FOR IMPROVED RETRANSMISSIONS

(71) Applicant: Telefonaktiebolaget L M Ericsson (publ), Stockholm (SE)

(72) Inventors: Ylva Timner, Luleå (SE); Håkan Axelsson, Linköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/902,549

(22) Filed: May 24, 2013

(65) Prior Publication Data

US 2013/0262950 A1   Oct. 3, 2013

Related U.S. Application Data

(63) Continuation of application No. 12/526,156, filed as application No. PCT/SE2007/050077 on Feb. 7, 2007, now Pat. No. 8,458,518.

(51) Int. Cl.
*G06F 11/00* (2006.01)
*H04L 1/08* (2006.01)
(Continued)

(52) U.S. Cl.
CPC ............... *H04L 1/08* (2013.01); *H04L 1/1829* (2013.01); *H04L 1/007* (2013.01); *H04L 1/1642* (2013.01)

(58) Field of Classification Search
CPC ......... H04L 1/007; H04L 1/08; H04L 1/1829; H04L 1/1642; H04L 1/1621; H04L 29/06; H04L 1/1809; H04L 1/1848; H04L 69/324; H04L 1/1628; H04W 28/04
See application file for complete search history.

(56) References Cited

U.S. PATENT DOCUMENTS 5,311,516 A    5/1994  Kuznicki et al.
6,956,855 B1   10/2005 Chang
(Continued)

FOREIGN PATENT DOCUMENTS

EP    0820167 A2    1/1998
EP    1006689 A2    6/2000
(Continued)

OTHER PUBLICATIONS

Jaiswal, S. et al. "Measurement and Classification of Out-of-Sequence Packets in a Tier-1 IP Backbone." Twenty-Second Annual Joint Conference of the IEEE Computer and Communications, INFOCOM 2003, IEEE Societies, vol. 2, Mar. 30-Apr. 3, 2003, pp. 1199-1209.

(Continued)

*Primary Examiner* — Guerrier Merant
(74) *Attorney, Agent, or Firm* — Coats & Bennett, PLLC

(57) ABSTRACT

The invention discloses a method for use in a cellular system with an RBS which controls traffic to and from a cell, with one User Equipment, UE, in the cell. The RBS and the UE receive and transmit information between each other, one of them being a sending party and the other one is a receiving party, and errors in messages which are received can be detected by the receiving party by a first error detection method and if errors are detected in received messages, the receiving party can request a retransmission from the transmitting party. The receiving party stores the order in which retransmissions are requested, so that erroneous retransmissions may be detected by the receiving party without the first error detection method.

20 Claims, 6 Drawing Sheets

(51) Int. Cl.
   *H04L 1/18*  (2006.01)
   *H04L 1/00*  (2006.01)
   *H04L 1/16*  (2006.01)

(56) References Cited

U.S. PATENT DOCUMENTS

| | | |
|---|---|---|
| 2003/0023915 A1 | 1/2003 | Choi |
| 2004/0153766 A1 | 8/2004 | Yamamoto et al. |
| 2005/0053093 A1 | 3/2005 | Fukushima et al. |
| 2005/0169199 A1 | 8/2005 | Futenma et al. |
| 2006/0023715 A1 | 2/2006 | Chen et al. |

FOREIGN PATENT DOCUMENTS

| | | |
|---|---|---|
| EP | 1708399 A2 | 10/2006 |
| EP | 1746773 A1 | 1/2007 |
| JP | 2001-119437 A | 4/2001 |
| JP | 2003-507928 A | 2/2003 |
| JP | 2005-130148 A | 5/2005 |
| JP | 2006-066948 A | 3/2006 |
| RU | 2121239 C1 | 10/1998 |
| WO | 0072498 A1 | 11/2000 |
| WO | 0113542 A1 | 2/2001 |

OTHER PUBLICATIONS

Hamzeh, K. et al. "Point-to-Point Tunneling Protocol (PPTP)." The Internet Society, Network Working Group, Request for Comments: 2637, Category: Informational, Jul. 1999, pp. 1-40.

METHOD AND A DEVICE FOR IMPROVED RETRANSMISSIONS

RELATED APPLICATIONS

This application is a continuation of U.S. patent application Ser. No. 12/526,156, filed Aug. 6, 2009, entitled "Method and a Device for Improved Retransmissions," which is a national stage entry under 35 U.S.C. §371 of international application no. PCT/SE2007/050077, filed Feb. 7, 2007, entitled "A Method and a Device for Improved Retransmissions". Each of the '156 and '077 applications are incorporated herein by reference in their entirety.

TECHNICAL FIELD

The present invention discloses a method for use in a cellular access system in which there can be at least one Radio Base Station which controls the traffic to and from a cell in the system, and in which system there can be at least one user with a User Equipment, UE, in the cell.

The RBS and the UE can receive and transmit information to and from each other, so that one of them is a sending party and the other one is a receiving party, and errors in messages which are received can be detected by the receiving party by means of an error detection method. If errors are detected in received messages, the receiving party can request the transmitting party to retransmit a message in which an error has been detected.

BACKGROUND

In a cellular access system such as a cellular telephony system, there is at least one cell, with one or more users in the cell, each of which user has a User Equipment, a UE, by means of which the user can communicate with the system. The system will also comprise at least one Radio Base Station, an RBS, which, inter alia, serves to control traffic to and from the UEs in the cell.

Thus, the UE and the RBS will communicate with each other, with the UE transmitting information to the RBS and receiving information from it, and likewise for the RBS with regard to the UE. In order to ensure that messages which are sent by one of the parties (UE/RBS) are received correctly by the receiving party (RBS/UE), a number of techniques are employed.

If the receiving party detects an error in a message that has been received from the transmitting party, or that a message has not been received at all, the receiving party can request a retransmission by the transmitting party, usually in the form of a NACK-message, Negative Acknowledge. In order to minimize the transmission delay it is essential that the receiving party can detect a transmission error as soon as possible. It is especially important to detect errors on retransmitted radio blocks or NACK-messages as soon as possible, since they correspond to already delayed radio blocks. A number of methods are used in order to achieve this, i.e. to detect erroneous retransmissions or NACK message errors:

One way to detect all kinds of transmission errors is to use a well protected header with a sequence number followed by separately coded data protected by an error detection code. If the header can be decoded, but the data is detected erroneous, the receiver can request a retransmission, i.e. send a NACK, for the block with the given sequence number.

It is also possible to use a timer for each retransmission, so that the receiving party starts a timer each time it requests a retransmission, i.e. sends a NACK. If the timer expires before the retransmission arrives, the receiver can conclude that either the NACK or the retransmission was erroneous, and a new NACK is sent.

However, with each of the methods described above, there are drawbacks, as illustrated in the following:

The method of detecting errors through error detecting codes requires the header to be separately decoded and correctly received, so that the sequence number of the lost packet is known. If the sequence number is not known, other methods are needed.

The method of using a timer for retransmissions is quite expensive, since all timers need to be maintained and controlled. In addition, it is difficult to obtain the correct value of a timer, since retransmissions may be delayed not only due to transmission errors, but also because of multi-user scheduling.

SUMMARY

Thus, as described above, there is a need for a solution by means of which erroneous retransmissions and erroneous NACK messages between a UE and an RBS in a cellular access system can be detected by the receiving party faster than with existing solutions, without the disadvantages of the methods described above.

This need is addressed by the present invention in that it discloses a method for use in a cellular access system in which there can be at least one Radio Base Station which controls the traffic to and from a cell in the system.

In the system in which the invention may be applied, there can be at least one user with a User Equipment, UE, in the cell, and the RBS and the UE can receive and transmit information between each other, so that one of them is a sending party and the other one is a receiving party.

According to the method of the invention, errors in messages which are received can be detected by the receiving party by means of a first error detection method, and if errors are detected in received messages, the receiving party can request the transmitting party to retransmit a message in which an error has been detected.

Further, according to the method of the invention, the receiving party keeps a memory of the order in which it requests retransmissions, so that erroneous retransmissions may be detected by the receiving party without the aid of the first error detection method. Upon detection of an erroneous retransmission, the receiving party may request a retransmission from the transmitting party of the erroneous retransmission.

Thus, the invention provides a method for detecting transmission errors of retransmitted blocks and/or NACK reports when the sequence number of erroneous radio blocks can not be decoded. Using the method of the invention, there is no need for timers that are expensive to maintain and unreliable in the presence of scheduling delays.

BRIEF DESCRIPTION OF THE DRAWINGS

The invention will be described in more detail with reference to the appended drawings, in which.

DETAILED DESCRIPTION

Figure 1:
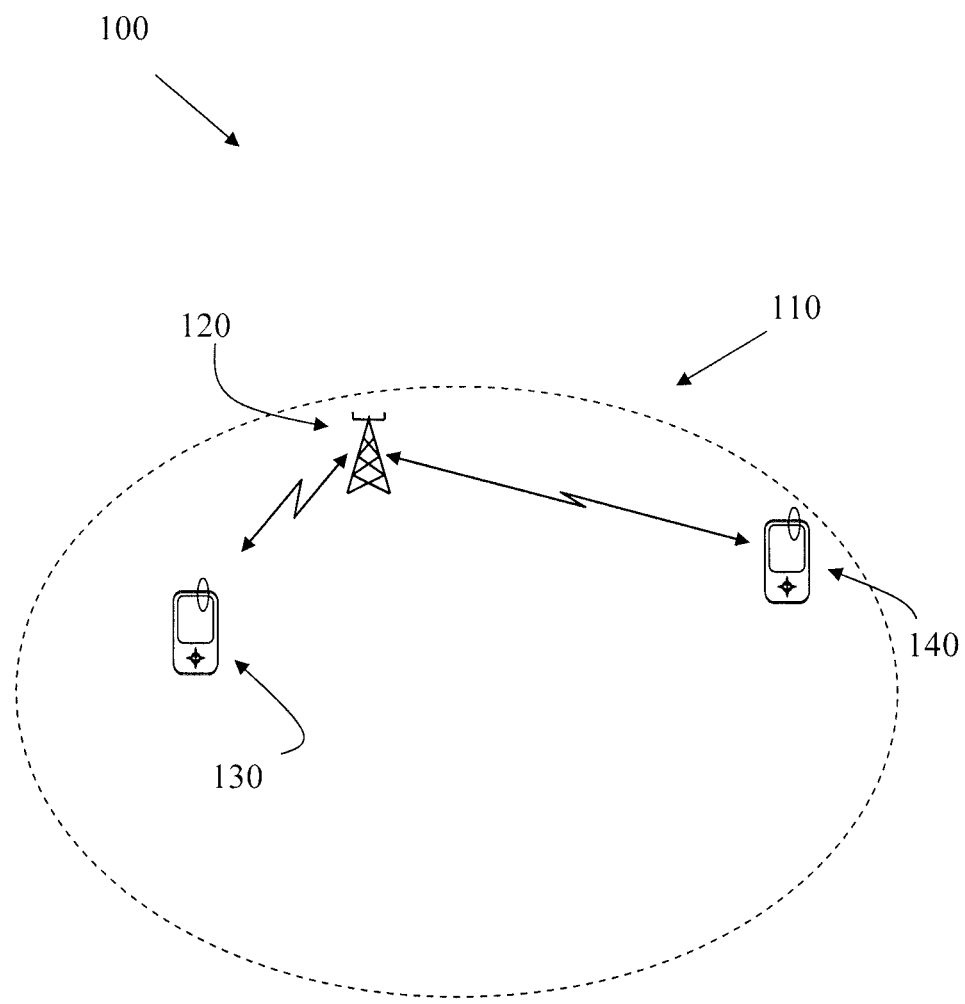
FIG. 1 shows an example of a system in which the invention may be applied.

FIG. 1 schematically shows a system 100 in which the invention may be applied. The system 100 is a cellular wireless access system, and as such comprises a number of cells, one of which is shown in FIG. 1 with the reference number 110.

The cell 110 comprises at least one radio base station, an RBS, shown as 120 in FIG. 1. The RBS 120 serves, inter alia, to control the traffic to and from users in the cell 110. The cell 110 can accommodate at least one user terminal, with two user terminals being shown in FIG. 1, with the reference numbers 130 and 140.

The system 100 is shown as a cellular telephony system, and the invention will be described with reference to such a system, but it should be pointed out that this is by way of example only, the invention may be applied to a number of different wireless access systems.

Also, the terminology used when describing the invention with reference to the system 100 is merely intended to facilitate the reader's understanding of the invention, and is not intended to restrict the scope of protection sought for the present invention. For example, the term base station or radio base station, RBS, should be interpreted as meaning a node in the system with the function of an RBS. In some systems, for example, a function essentially corresponding to that of the RBS is performed by a node called Node B. Such systems are naturally also encompassed by the invention.

Similarly, it should be realized that the term user terminal or UE is merely an example intended to facilitate the reader's understanding of the invention. For example, in some systems, the terms UT, User Terminal, or MS, Mobile Station, are used. Naturally, such systems are also encompassed by the scope of the present invention.

In addition, although the UEs 130, 140, are shown as cellular telephones in FIG. 1, it should be realized that this is merely to facilitate the understanding of the invention, the UEs may be many other kinds of devices, portable or stationary, such as, for example, computers.

As explained previously in this text, the UEs 130, 140, can send traffic to the RBS 120, as well as being able to receive traffic from the RBS. If a receiving party, either a UE or an RBS detects an error in a received message, or detects the absence of a message which has been received, the receiving party can request the transmitting party (RBS or UE) to retransmit the damaged or missing message, by means of sending a so called NACK, Negative Acknowledge, message.

The present invention primarily aims at speeding up the data transmission through fast detection of transmission errors on retransmitted data and NACK messages.

A basic idea of the invention is to detect errors of retransmissions or in NACK reports by means of letting the receiving party keep track of the sequence of requested retransmissions and compare it to the sequence of received retransmissions. In other words, the order in which retransmissions are requested by the receiving party is stored, and if, for example, the retransmission of block n was requested after the retransmission of block k, an error can be detected by the receiving party if the retransmission of block n is received before the retransmission of block k is received, and a new NACK for block k can be sent by the receiving party to the transmitting party.

Thus, according to the invention, errors of retransmissions or NACK reports are detected by the receiving party since that party keeps track of or stores the sequence in which it requests retransmissions. If, for example, the retransmission of block n was requested after the retransmission of block k, an error can be detected if block n is received before block k, and a renewed NACK for block k can be sent by the receiving party to the transmitting party.

Some examples of how the method of the invention may be employed will now be given in order to facilitate the reader's understanding of the invention.

Figure 2:
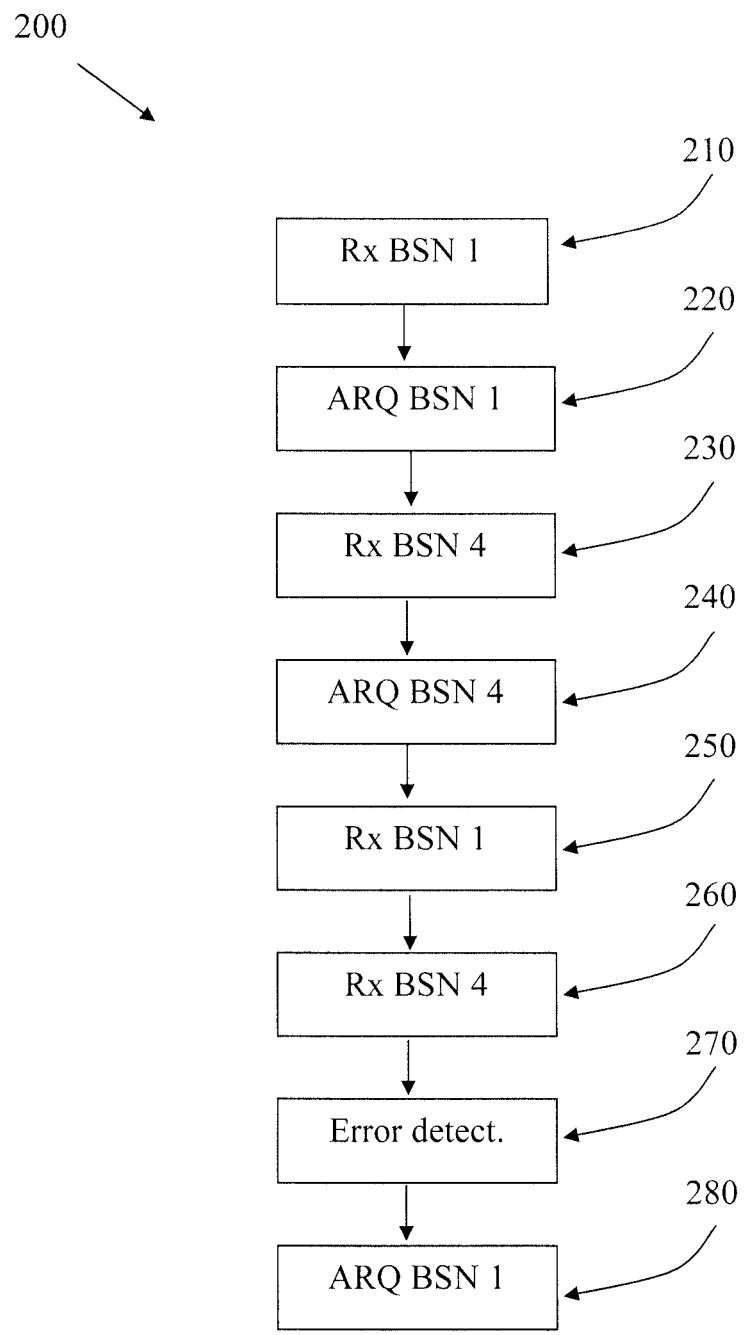
FIGS. 2-4 show exemplary flow charts of the method of the invention.
Figure 3:
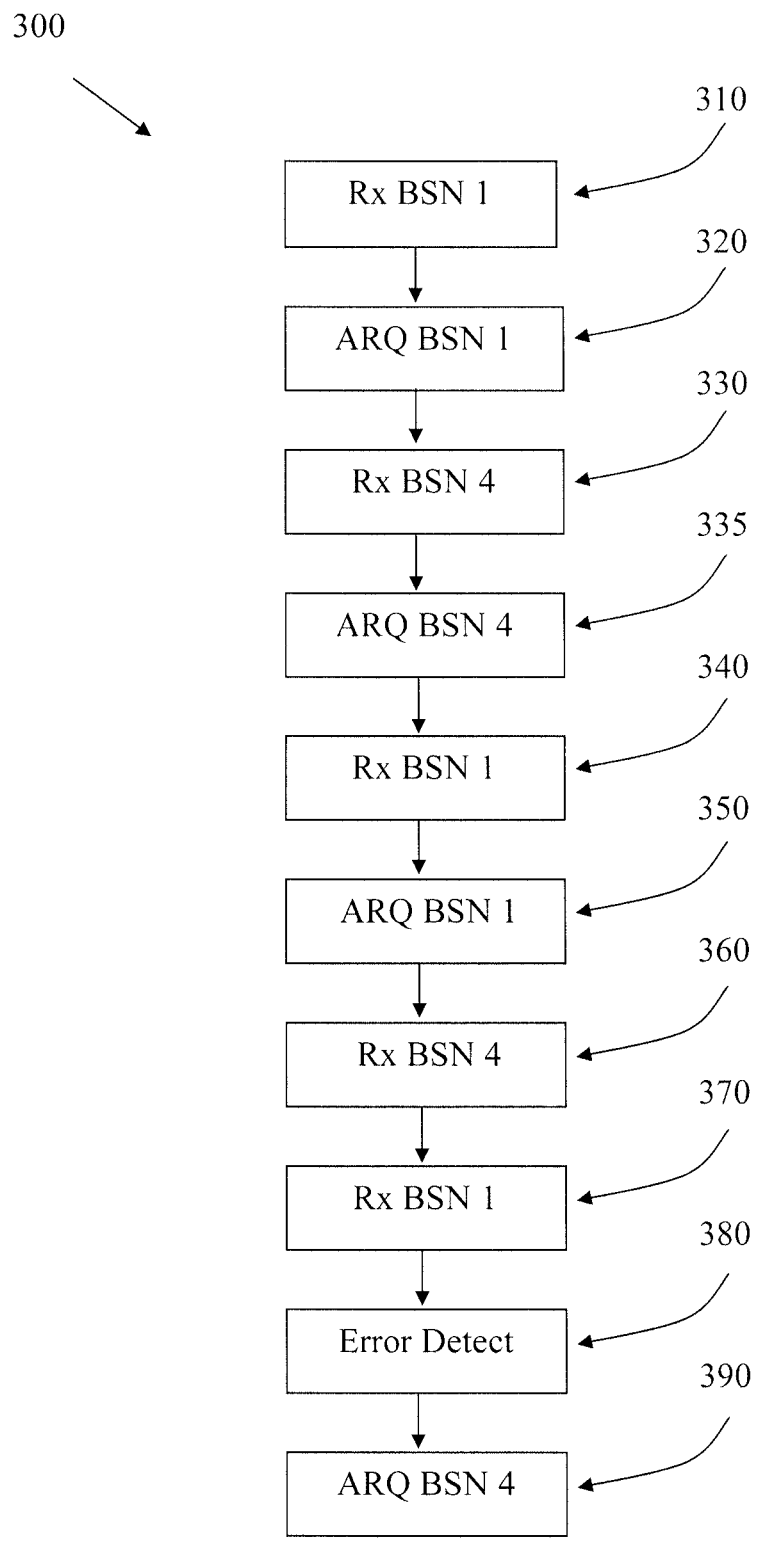

The examples will be illustrated by means of the flowcharts in FIGS. 2 and 3.

Some abbreviations which will be used in the examples below are:
BSN—Block Sequence Number
ARQ—Automatic Repeat Request In the examples below, it will, for the sake of simplicity, be assumed that the RBS 120 is the receiving party and one of the UEs 130, 140, is the transmitting party, but it should be pointed out that this is an example only, either of the RBS/UE can be the transmitting or the sending party, the invention is equally applicable for either case.

First, with reference to the flow chart 200 in FIG. 2, the RBS 120 detects that BSN 1 was received with an error, step 210, and a first retransmission of BSN 1 is requested, step 220. How the first detection of an error in received data is detected by the RBS is not within the scope of the invention, and can be done in a number of ways, such as error detecting codes or detecting if the received BSN is "in sequence" or not.

In step 230, the reception of BSN 4 is also detected as erroneous, and in step 240 a first retransmission of BSN 4 is requested. In step 250, the first retransmission of BSN 1 is also received as erroneous, but with a corrupt header, so the error is not detected by the first error detection mechanism.

When the first retransmission of BSN 4 is received, step 260, the header is correctly decoded, and since the RBS keeps track of when this retransmission was requested, and thus knows that it was after the request of retransmission of BSN 1, a retransmission out of sequence event is detected according to the invention, step 270, and a second retransmission of BSN 1 is thus requested by the RBS in step 280.

Another example of an application of the invention is given in the flow chart 300 in FIG. 3: In step 310, the reception of BSN 1 from the UE is detected as erroneous in the RBS, and a first retransmission of BSN 1 is requested by the RBS in step 320. In step 330, the reception of BSN 4 is also detected as erroneous, and a first retransmission of BSN 4 from the UE is requested by the RBS in step 335.

In step 340, the first retransmission of BSN 1 is also received as erroneous, and in step 350 a second retransmission from the UE is requested by the RBS. In step 360, the first retransmission of BSN 4 is received with a corrupt header, so no error is detected by the first error detection mechanism.

However, when the second retransmission of BSN 1 is received, step 370, the RBS, by means of the invention, knows that this retransmission was requested after the retransmission of BSN 4, and a retransmission out of sequence event is detected, step 380. In step 390, a new retransmission of BSN 4 is thus requested from the transmitting party.

In a version of the invention, in order to allow the transmitting party to use different priorities of the retransmissions without triggering a NACK from the receiving party by means of the present invention, the error detection method of the invention could be modified so that before a NACK for a block k is sent, i.e. before an error is indicated in the reception of block k, both a retransmission of block n should have been received, and after that, any other block that is not a retransmission should have been received. This will be explained in more detail in the following:

Using the principles of the invention explained with the aid of FIGS. 2 and 3, the receiving party will detect errors in received data incorrectly if the retransmissions are scheduled (usually by the transmitting party) through some other priority algorithm than FIFO, First In, First Out.

Figure 4:
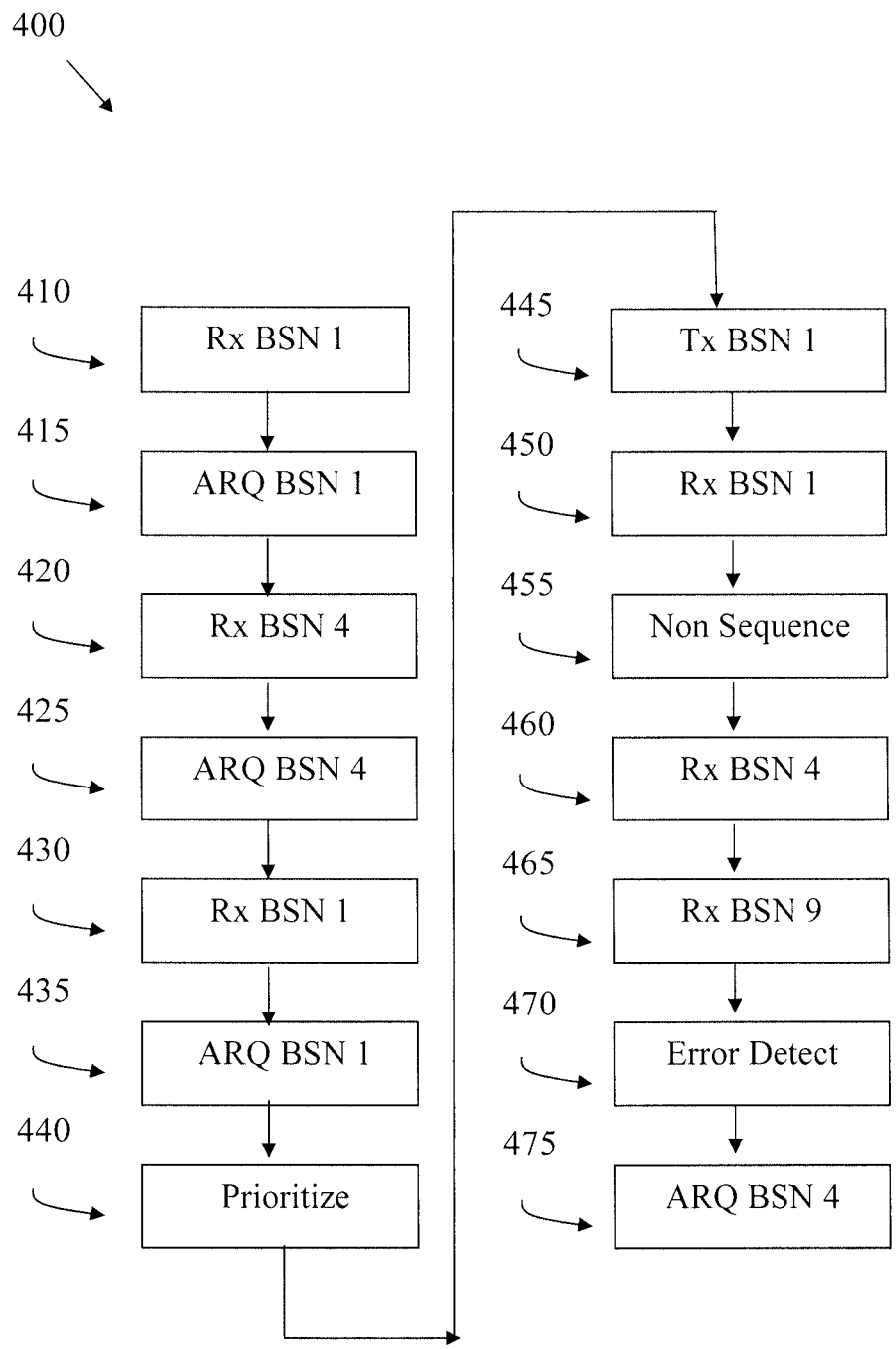

If the scheduling priority of the retransmissions are unknown, but it is known that the retransmissions are prioritized over new transmissions, the invention can be modified so that both a retransmission of block n which was requested after the retransmission of block k, is received, and after that, a first transmission of at least one other block that is not a retransmission should also have been received. This version of the invention is illustrated more closely in the flow chart 400 in FIG. 4: In step 410, the reception of a first transmission of BSN 1 is detected as erroneous by means of the first error detection mechanism, and a first retransmission is requested in step 415.

In step 420, the reception of BSN 4 is also detected erroneous, and a first retransmission is requested, step 425. The first retransmission of BSN 1 is also received erroneously, step 430, and a second retransmission of BSN 1 is requested, step 435.

The transmitting party, for example, decides that the retransmission of BSN 1 has higher priority than that of BSN 4, step 440, so the transmitter resends BSN 1 first, step 445. When BSN 1 arrives at the receiver, step 450, the receiving party detects that BSN 1 is received out-of-sequence, step 455, but it waits before it sends a NACK for BSN 4. The second retransmission of BSN 4 is then received, step 460, but the data and header are corrupt, so the receiver can not detect an error. After that, the first transmission of BSN 9 is received correctly, step 465. The receiver has now received both a retransmission out of sequence and after that a first transmission of at least one other block, and can therefore detect an error, step 470, and sends a NACK for BSN 4, step 475.

Figure 5:
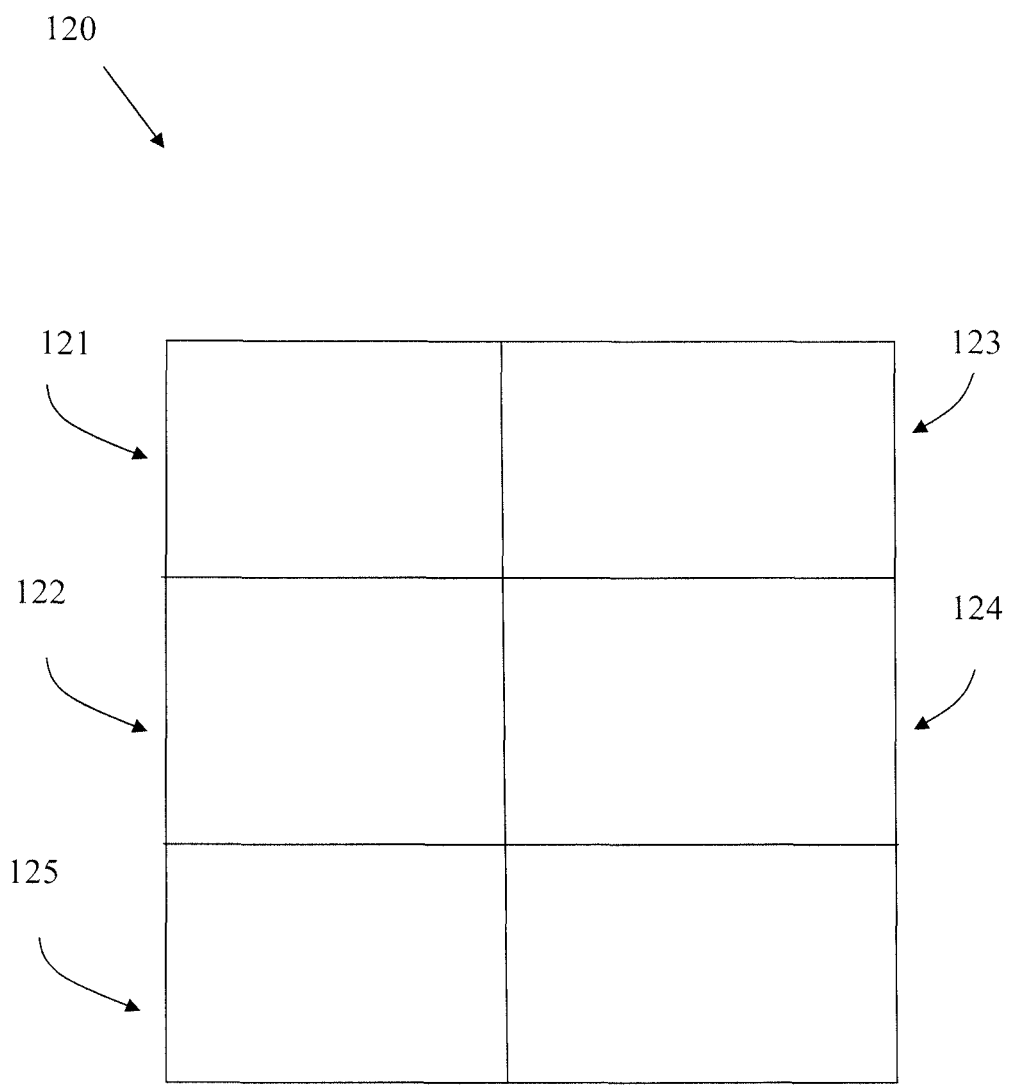
FIG. 5 shows a block diagram of an RBS of the invention.

FIG. 5 shows a rough outline of some of the components in an RBS 120 of the invention: As indicated in FIG. 5, the RBS 120 comprises means 121 for receiving and transmitting information to and from a UE, so that the RBS 120 can be either the sending party or the receiving party with respect to the UE.

The RBS 120 comprises first means 122 for detecting errors in messages which are received from a UE by means of a first error detection method.

The RBS 120 comprises means 123 for requesting a UE to retransmit a message in which an error has been detected, and the RBS 120 also comprises means 124 for storing the order in which it requests retransmissions, so that erroneous retransmissions may be detected by retransmission error detection means 125 without the aid of the first error detection means, following which the RBS 120 may request a retransmission from a UE of erroneously received retransmissions.

Figure 6:
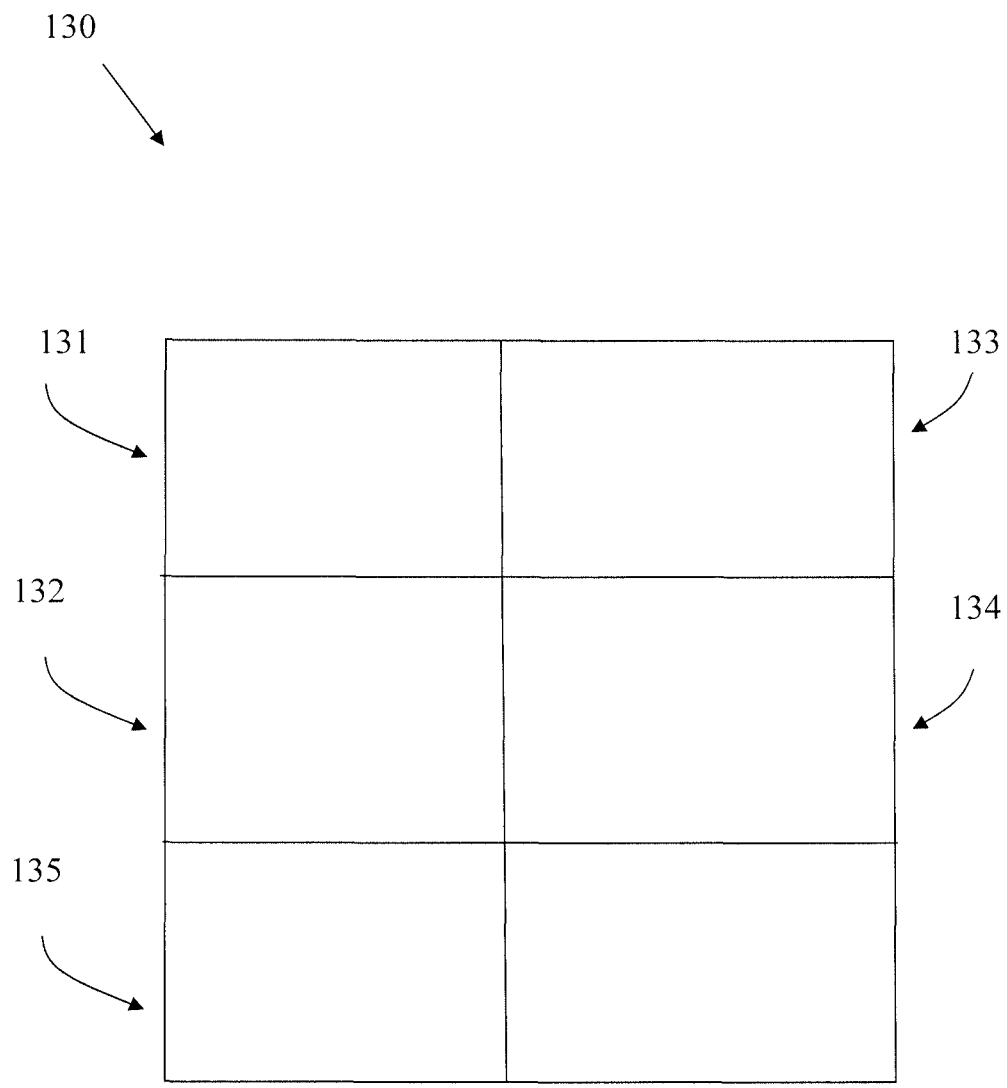
FIG. 6 shows a block diagram of a UE of the invention.

FIG. 6 shows a rough outline of some of the components in a UE 130 of the invention: As indicated in FIG. 6, the UE 130 comprises means 131 for receiving and transmitting information to and from an RBS, so that the UE 130 can be either the sending party or the receiving party with respect to the RBS.

The UE 130 comprises first means 132 for detecting errors in messages which are received from an RBS by means of a first error detection method.

The UE 130 comprises means 133 for requesting an RBS to retransmit a message in which an error has been detected, and the UE 130 also comprises means 134 for storing the order in which it requests retransmissions, so that erroneous retransmissions may be detected by retransmission error detection means 135 without the aid of the first error detection means, following which the UE 130 may request a retransmission from an RBS of erroneously received retransmissions.

The invention is not limited to the examples of embodiments described above and shown in the drawings, but may be freely varied within the scope of the appended claims.

It should also be pointed out that in order to facilitate for the reader, the term "message" has been used more or less consistently throughout this text to describe traffic between two parties. As such, the word "message" in this text can denote both such traffic which sometimes is referred to as "data" as well as traffic which is traditionally referred to as "messages".

The invention claimed is:

1. A method, performed at a receiving device, for detecting erroneous retransmissions of messages, the method comprising:
    detecting errors in messages received from a sending device, wherein the messages include retransmitted messages;
    requesting the sending device to retransmit the messages in which errors are detected, and recording a retransmission order in which retransmissions of the messages are requested, wherein the retransmission order is updated to add entries corresponding to messages whose retransmissions are detected to be erroneous and messages whose transmissions are detected to be erroneous; and
    detecting erroneous retransmissions of messages based on whether the retransmitted messages are received from the sending device in the recorded retransmission order and without aid of a retransmission timer.

2. The method of claim 1 wherein the specified retransmission order comprises a non-sequential order of messages in which the errors were detected.

3. The method of claim 1 further comprising storing the specified retransmission order at the receiving device.

4. The method of claim 1 wherein detecting erroneous retransmissions of messages based on whether the retransmitted messages are received from the sending device in the specified retransmission order and without aid of a retransmission timer comprises detecting a retransmitted message as being erroneous if the retransmitted message is not received in the specified retransmission order.

5. The method of claim 1 further comprising detecting the erroneous retransmissions of retransmitted messages in accordance with a priority assigned to the retransmitted messages by the sending device.

6. The method of claim 5 wherein the specified retransmission order indicates that the sending device is to retransmit a second message before the sending device retransmits a first message, and wherein detecting the erroneous retransmissions of retransmitted messages in accordance with the assigned priority comprises:
    receiving the retransmissions of the first and second messages from the sending device wherein the first message has been assigned a priority that is higher than a priority of the second message;
    receiving a third message from the sending device, wherein the third message is not a retransmitted message and has been assigned a priority by the sending device that is lower than the first and second messages; and
    detecting an erroneous retransmission of the second message if the first message is not received in the specified retransmission order, and if the third message is received before the second retransmitted message is correctly received.

7. The method of claim 6 further comprising delaying sending a retransmission request to the sending device for the first message until determining whether the second message was erroneously received.

8. The method of claim 1 wherein requesting the sending device to retransmit the messages in which errors are detected in a specified retransmission order comprises requesting a retransmission of a message each time an error is detected.

9. A receiving device for detecting erroneous retransmissions of messages transmitted by a sending device via a communications network, the receiving device configured to:
  detect errors in the messages received from the sending device, wherein the messages include retransmitted messages;
  request the sending device to retransmit the messages in which errors are detected, and recording a retransmission order in which retransmissions of the messages are requested, wherein the retransmission order is updated to add entries corresponding to messages whose retransmissions are detected to be erroneous and messages whose transmissions are detected to be erroneous; and
  detect erroneous retransmissions of messages based on whether the retransmitted messages are received from the sending device in the recorded retransmission order and without aid of a retransmission timer.

10. The receiving device of claim 9 wherein the specified retransmission order comprises a non-sequential order of messages in which the errors were detected.

11. The receiving device of claim 9 wherein the receiving device is further configured to store the specified retransmission order.

12. The receiving device of claim 9 wherein the receiving device is further configured to detect a retransmitted message as being an erroneously retransmitted message if the retransmitted message is not received in the specified retransmission order.

13. The receiving device of claim 9 wherein the receiving device is further configured to detect the erroneous retransmissions of retransmitted messages in accordance with a priority assigned to the retransmitted messages by the sending device.

14. The receiving device of claim 13 wherein the specified retransmission order indicates that the sending device is to retransmit a second message before the sending device retransmits a first message, and wherein to detect the erroneous retransmissions of retransmitted messages in accordance with the assigned priority, the receiving device is further configured to:
  receive the retransmissions of the first and second messages from the sending device wherein the first message has been assigned a priority that is higher than a priority of the second message;
  receive a third message from the sending device, wherein the third message is not a retransmitted message and has been assigned a priority by the sending device that is lower than the first and second messages; and
  detect an erroneous retransmission of the second message if the first message is not received in the specified retransmission order, and if the third message is received before the second retransmitted message is correctly received.

15. The receiving device of claim 14 wherein the receiving device is further configured to send a retransmission request to the sending device for the first message until it is determined whether the second message was erroneously received.

16. The receiving device of claim 9 wherein the receiving device is configured to request a retransmission of a message each time an error is detected.

17. The receiving device of claim 9 wherein the receiving device comprises one of a radio base station (RBS) communicating with a User Equipment (UE), and wherein the sending device comprises the other of the RBS and the UE.

18. A method, performed at a receiving device, for detecting erroneous retransmissions of messages, the method comprising:
  detecting errors in messages received from a sending device, wherein the messages include retransmitted messages;
  requesting the sending device to retransmit the messages in which errors are detected, and recording a retransmission order in which retransmissions of the messages are requested, wherein the retransmission order is updated to add entries corresponding to messages whose retransmissions are detected to be erroneous and messages whose transmissions are detected to be erroneous; and
  detecting erroneous retransmissions of messages if the retransmitted messages are not received in the recorded retransmission order.

19. A Radio Base Station (RBS) for use in a cellular access system, for controlling of traffic to and from a cell in the system, in which cell there can be at least one User Equipment (UE) in the cell, the RBS configured to:
  detect errors in messages received from the UE, wherein the messages include retransmitted messages;
  request the UE to retransmit the messages in which errors are detected, and recording a retransmission order in which retransmissions of the messages are requested, wherein the retransmission order is updated to add entries corresponding to messages whose retransmissions are detected to be erroneous and messages whose transmissions are detected to be erroneous; and
  detect erroneous retransmissions of messages if the retransmitted messages are not received in the recorded retransmission order.

20. A User Equipment (UE) for use in a cellular access system that includes a Radio Base Station (RBS) for the control of traffic to and from a cell in the system in which cell the UE can be used, the UE is configured to:
  detect errors in messages received from the RBS, wherein the messages include retransmitted messages;
  request the RBS to retransmit the messages in which errors are detected, and record a retransmission order in which retransmissions of the messages are requested, wherein the retransmission order is updated to add entries corresponding to messages whose retransmissions are detected to be erroneous and messages whose transmissions are detected to be erroneous; and
  detect erroneous retransmissions of messages if the retransmitted messages are not received in the recorded retransmission order.

* * * * *